United States Patent

Witte

[15] 3,699,470
[45] Oct. 17, 1972

[54] ELECTROSTATIC GAS BY-PASS FOR ION LASERS

[72] Inventor: Robert S. Witte, Redondo Beach, Calif.

[73] Assignee: TRW Inc., Redondo Beach, Calif.

[22] Filed: July 6, 1971

[21] Appl. No.: 159,812

[52] U.S. Cl. .................331/94.5, 313/204, 330/4.3
[51] Int. Cl. ..............................................H01s 3/02
[58] Field of Search ........331/94.5; 313/204; 330/4.3

[56] References Cited

UNITED STATES PATENTS

| | | |
|---|---|---|
| 3,466,567 | 9/1969 | Neusel......................331/94.5 |
| 3,582,818 | 6/1971 | Rudolph....................331/94.5 |
| 3,582,821 | 6/1971 | Gordon et al.............331/94.5 |
| 3,611,186 | 10/1971 | Witteman.................331/94.5 |
| 3,628,176 | 12/1971 | Medicus....................331/94.5 |

FOREIGN PATENTS OR APPLICATIONS

| | | |
|---|---|---|
| 1,347,722 | 11/1963 | France......................331/94.5 |

Primary Examiner—William L. Sikes
Attorney—Daniel T. Anderson et al.

[57] ABSTRACT

A gas ion laser having a gas reservoir and a by-pass, or connecting portion between the outer ends of the main envelope of the gas laser. Such a gas by-pass is necessary to equalize the pressure in the main discharge chamber during operation of the gas ion laser. Due to cataphoresis the gas pressure builds up at the anode, and for proper operation this pressure must be equalized. On the other hand, it is necessary to prevent the gas discharge from passing through the gas reservoir. This is accomplished by the present invention by inserting into the connecting portion of the gas reservoir between the main discharge and the reservoir an electrically conductive duct which provides a floating electric potential thereby to inhibit an electric discharge through the conductive duct.

9 Claims, 2 Drawing Figures

PATENTED OCT 17 1972 3,699,470

Robert S. Witte
INVENTOR.

BY *[signature]*

ATTORNEY

ELECTROSTATIC GAS BY-PASS FOR ION LASERS

BACKGROUND OF THE INVENTION

This invention relates generally to gas ion lasers, and particularly relates to an electrostatic gas by-pass for such a laser.

It is well known that during the operation of a gas ion laser the gas pressure increases at the anode end of the laser discharge tube. This is due to cataphoresis, that is, due to the movement of the ions and atoms in the electric field which is maintained between the cathode and the anode of the gas discharge. The resulting pressure increase at the anode results in a reduction of gain of On laser.

Conventionally, this pressure buildup is relieved by providing a gas by-pass between the two ends of the discharge tube. The by-pass conventionally is in the form of a coil which interconnects cathode and anode sections of the discharge tube. However, the electrical impedance of the by-pass must be greater than the electrical impedance of the laser discharge path because otherwise the discharge may pass through the by-pass instead of the main discharge tube. On the other hand, the by-pass must be sufficiently large in diameter to permit equalization of the gas pressure.

The present invention may be considered to be an improvement over that disclosed in a patent to Robert H. Neusel U.S. Pat. No. 3,466,567 which issued on Sept. 9, 1969 and is assigned to the assignee of the present invention. The Neusel patent discloses a screen electrode inserted into the interconnection between the gas reservoir and the laser discharge. It has been found that this screen electrode may be connected to the cathode through a high resistance or may be electrically tied or shorted to the cathode. It has also been found that it may be left floating. However, it has been found that the most practical arrangement depends on the particular type of laser tube and its operating conditions and this is difficult to predict before the tube is actually operated.

It is accordingly an object of the present invention to provide a gas ion laser provided with a gas by-pass which combines low impedance to the flow of the gas with high impedance to an electric discharge therethrough.

A further object of the present invention is to provide a gas ion laser with a by-pass of the type discussed which is both simple and inexpensive in construction, not subject to breakage.

Another object of the present invention is to provide a gas ion laser having a gas by-pass which substantially prevents electric discharge therethrough and which may be used with either a hot or cold cathode.

SUMMARY OF THE INVENTION

In accordance with the present invention there is provided a gas ion laser. Such a gas ion laser may, for example, consist of a noble gas such as argon or xenon or any other gas capable of lasing in its ionized state. The laser includes a main envelope consisting of an insulating material and includes a suitable ionizable and laserable gas. The envelope is provided with an anode and a cathode which are disposed substantially at opposite ends of the envelope. Accordingly, during operation of the gas ion laser, gas pressure builds up at the anode due to cataphoresis.

There is further provided a gas reservoir also consisting of an insulating material and having connecting portions which are connected substantially to the ends of the main envelope. The gas reservoir with its connecting portion serves the purpose of equalizing the gas pressure in the main envelope. Finally, one of the connecting portions includes a conductive duct to provide a floating electric potential. This, in turn, prevents gas discharge from passing through the reservoir.

While the action of the conductive duct is not precisely understood at this time, it is believed that it provides a field-free space which prevents electron avalanching which is normally required to ionize the gas and to maintain the electric discharge.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
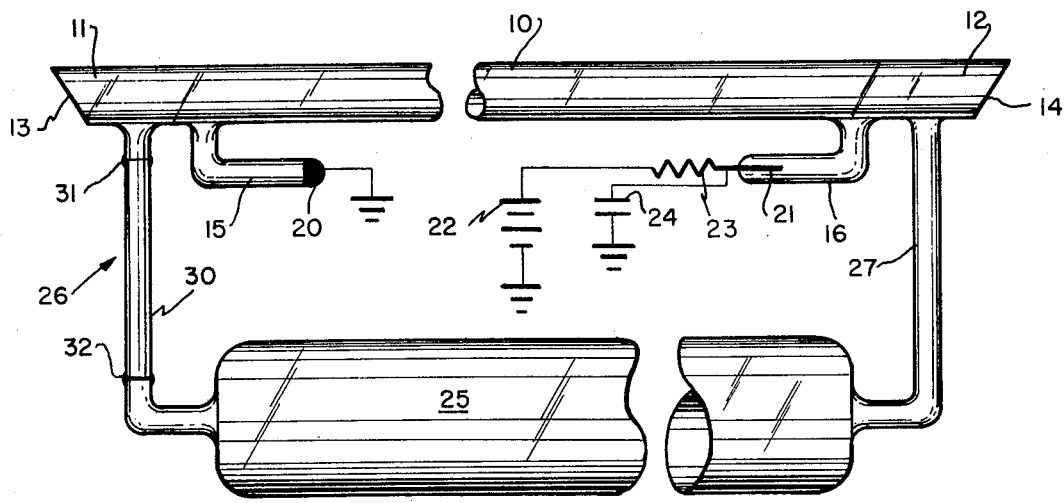
FIG. 1 is an elevational view of a gas ion laser, parts being broken away, and including the gas by-pass in accordance with the present invention, and also illustrating a circuit for operating the laser.

Referring now to the drawing, and particularly to FIG. 1 there is illustrated a gas ion laser including the gas by-pass of the present invention. The gas ion laser of FIG. 1 includes a main envelope 10 consisting of an insulating material. For example, the envelope 10 may consist of glass, quartz or a suitable ceramic. The main envelope 10 has two end portions 11 and 12. Each of the end portions may be provided with a window 13 and 14 transparent to the optical radiation emitted by the gas ion laser.

The transparent windows 13 and 14 are preferably arranged at the Brewster angle. This angle is such that the light passes through the windows substantially without loss and becomes linearly polarized.

The main envelope 10 may be provided with two communicating appendices 15, 16 which may consist of the same material as does the main envelope 10. A cathode 20 is disposed in the appendix 15 and an anode 21 is located in the appendix 16.

The cathode 20 and the anode 21 may consist of any suitable material. For example, the cathode 20 may be a conventional hot cathode. Alternatively, it may be a cold cathode of the type disclosed and claimed in the U.S. Pat. to Robert S. Witte and Charles E. Wood No. 3,555,451 which issued on Jan. 12, 1971. As disclosed in the Witte et al. patent the cold cathode may consist of bismuth, lead, tin, indium or gallium. Thus, by way of example, the cathode 20 may consist of indium and may be grounded as shown.

The anode 21 may, for example, consist of a pin of tungsten. However, it will be understood that the anode 21, if desired, may consist of the same material as does the cold cathode 20. Thus, the cathode 20 and anode 21 may consist both of indium.

A positive potential is applied to the anode 21 by means of a battery 22 having its negative terminal grounded while its positive terminal is connected to the anode pin 21 by a suitable resistor 23. A capacitor 24 may be connected between the junction points of pin 21 and resistor 23 on the one hand and ground on the other hand. The combination of resistor 23 and capacitor 24 will provide a time constant charging circuit so as to provide a predetermined voltage at the anode 21.

In accordance with the present invention there is provided a gas reservoir 25 which is interconnected to the two ends 11 and 12 of the main envelope 10 by two interconnecting portions 26 and 27. The duct or portion 27 may also consist of the same material as does the main envelope 10. However, in accordance with the present invention, the interconnecting portion 26 includes a conductive duct 30. The duct 30 may consist of any conductive material. Preferably, it consists of a metal. Thus, if the envelope 10 and the interconnecting portion 26 consists of glass, it is preferred to utilize an alloy consisting of iron, nickel and cobalt which is sold under the trade name "Kovar." Such an alloy has substantially the same coefficient of expansion as does glass and may, therefore, be readily sealed to the interconnecting portion 26 by means of the seals 31 and 32.

During operation of the gas ion laser of FIG. 1, gas pressure at the anode rises. This is due to cataphoresis and may be explained by the movement of the charged ions and atoms in the electric field created by the voltage applied between cathode 20 and anode 21. When the gas pressure at the anode increases in this manner, the efficiency of the laser decreases. For that reason it has long been recognized that it is desirable to provide a gas by-pass between the two ends 11 and 12 of the gas laser. Such a gas by-pass should have a low impedance to the flow of the gas. In other words, it should have a diameter large enough to permit the free flow of gas molecules to equalize the pressure. On the other hand, it is highly undesirable that the electric discharge take place through the gas by-pass rather than through the main envelope 10 of the laser.

The exact operation of the conductive duct 30 is not fully understood at this time. However, it will be evident that an electrically conductive duct will provide a field-free space at a floating potential. It is now believed that this impedes the avalanching effect of the electrons which is necessary to ionize the gas molecules and thereby maintain a discharge. Thus, the conductive duct 30 substantially prevents an electric discharge from passing through the interconnecting portion 26 gas reservoir 25 and the interconnecting portion 27.

The gas ion laser otherwise operates in a conventional manner. The gas may consist of any ionizable and laserable gas. This includes certain noble gases such, for example, as argon or xenon.

In some cases it may be desirable or necessary to provide a starting electrode to initiate pulsed or continuous wave laser operation. Such a starting electrode has not been illustrated because it forms no part of the present invention. In this connection reference is made to a co-pending application to Robert S. Witte et al. filed on Apr. 28, 1971, D-4786, Ser. No. 138,141 and assigned to the assignee of the present application.

The length and diameter of the conductive duct 30 may have to be empirically determined and depends on the diameter of the main envelope 10, the pressure of the gas in the envelope, the particular gas used, and the voltage supplied between the anode and cathode, that is, the voltage of the battery 22. Assuming that the conductive duct 30 consists of "Kovar," and for discharge path 2 to 3 feet in length and 3 to 5 millimeters in diameter, typical dimensions of the duct are a length of 1 to 2 inches, a diameter of ⅛ of an inch to ¼ of an inch. As a convenient rough guide for the length L of the conductive duct 30, the following formula may be used:

$$L = 0.2P,$$

where $L$ is measured in inches and $P$ is the gas pressure in microns. A rough guide for the diameter of the duct 30 is given by the following formula:

$$D = 5/P,$$

where $D$ is in centimeters if $P$ is measured again in microns.

Figure 2:
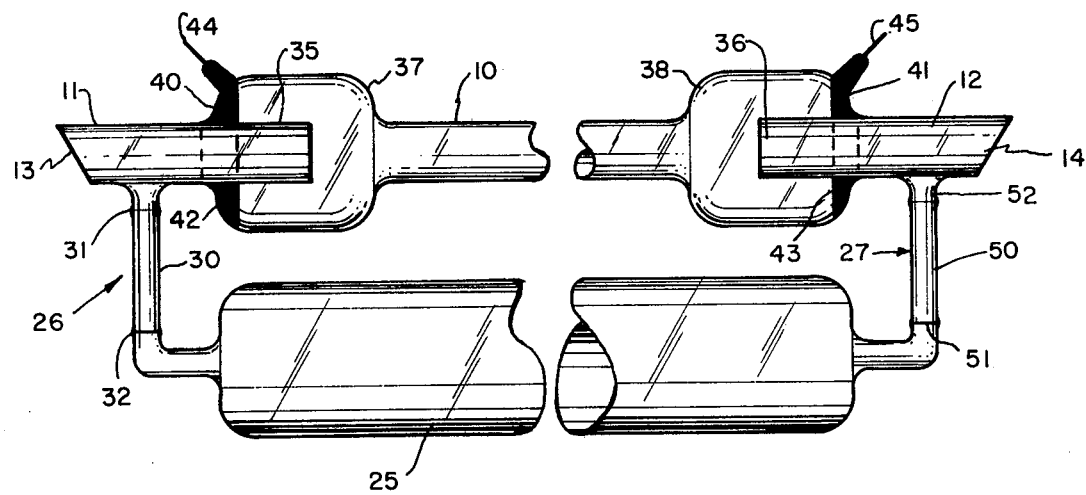
FIG. 2 is an elevational view, parts being broken away, similar to that of FIG. 1, but illustrating a different electrode construction.

Another configuration of the gas ion laser of the present invention is illustrated in FIG. 2 to which reference is now made. This makes use of a pair of coaxial cathodes of the type disclosed and claimed in the co-pending application to Witte et al. above referred to. The gas ion laser, FIG. 2, again includes a main envelope 10 having tubular end portions 11 and 12. Each of the end portions, 11 and 12, continues to form as inwardly extending tube portion 35 and 36. The two tube portions 35 and 36 face each other and are surrounded by enlarged portions 37 and 38 which in turn connect to the main envelope 10. Accordingly, an annular recess 40 and 41 is formed respectively between tube portion 35 and enlarged portion 37 on one end and between tube portion 36 and enlarged portion 38 on the other end.

Electrodes 42 and 43 are respectively disposed in the two annular recesses to form respectively a cathode and an anode. Preferably, as disclosed in the co-pending Witte et al. application previously referred to, the electrodes 42 and 43 consist both of indium. Each electrode is provided with a pin 44 and 45 which permits electrical contact to be made to the electrode.

The various envelope portions such as 10, 11, 12, 25, 26, 27, 35, 36, and 37, 38 may again consist of a suitable glass or ceramic. The interconnecting portion 26 includes the conductive duct 30. Also, the interconnecting portion 27 may be provided with a conductive duct 50 sealed to the insulating envelope portion by seals 51 and 52.

Otherwise, the gas ion laser of FIG. 2 operates in the same manner as does that of FIG. 1. Accordingly, it will be appreciated that the gas laser may be operated with a cold cathode which may be coaxial as shown in FIG. 2 or alternatively with a hot cathode, as is conventional.

There has thus been disclosed a gas ion laser of the type permitting continuous operation which includes a gas by-pass combining low impedance to the gas flow with high electrical impedance to inhibit discharge therethrough. The conductive duct forming part of the gas by-pass simplifies the construction of the laser and reduces its cost. It also makes for a more compact configuration and minimizes the problem of breakage of the envelope. It eliminates the necessity of an electrical connection to the gas by-pass as was necessary in accordance with the construction disclosed and claimed in the Neusel patent.

What is claimed is:

1. A gas ion laser comprising:
 a. a main envelope consisting of an insulating material and including an ionizable and laserable gas;
 b. an anode and a cathode disposed substantially at opposite ends of said envelope, whereby during operation of said gas ion laser gas pressure builds up at said anode due to cataphoresis;
 c. a gas reservoir consisting of an insulating material and having connecting portions connected substantially to the ends of said main envelope for equalizing the gas pressure in said main envelope; and
 d. one of said connecting portions including a conductive duct to provide a floating electric potential to prevent the gas discharge from passing through said reservoir.

2. A gas ion laser as defined in claim 1 wherein said conductive duct consists of metal.

3. A gas ion laser as defined in claim 1 wherein said conductive duct consists of an alloy of iron, nickel and cobalt while said main envelope consists of glass.

4. A gas ion laser as defined in claim 1 wherein said cathode is selected from a member of the group consisting of bismuth, lead, tin, indium and gallium.

5. A gas ion laser as defined in claim 4 wherein said main envelope is provided with two opposite tubes, one on each end thereof, and wherein each of said tubes is surrounded by an enlarged envelope portion forming an annular recess with its associated tube, said cathode and said anode being each disposed in one of said annular recesses.

6. A gas ion laser comprising:
 a. an elongated envelope of insulating material, said envelope being filled with an ionizable, laserable gas, said envelope comprising two tube-like portions having open ends facing each other and being interconnected by the enlarged main portion of said envelope;
 b. a cathode and an anode each being disposed between one of the end portions of said envelope and the respective enlarged end portion, and said cathode consisting of indium, whereby during operation of said laser gas pressure builds up at said anode due to cataphoresis;
 c. a gas reservoir for supplying gas to said main envelope, said gas reservoir having interconnecting portions connected to the end portions of said main envelope; and
 d. one of said interconnecting portions consisting of a conductive material to provide a field-free space to minimize the occurrence of an electric discharge therethrough.

7. A gas laser as defined in claim 6 wherein both of said interconnecting portions consist of metal.

8. A gas laser as defined in claim 7 wherein said metal is an alloy of iron, nickel and cobalt.

9. A gas laser as defined in claim 6 wherein both said cathode and said anode consist of indium.

* * * * *